United States Patent
Perry et al.

(10) Patent No.: US 9,774,044 B2
(45) Date of Patent: Sep. 26, 2017

(54) FLOW BATTERY STACK WITH AN INTEGRATED HEAT EXCHANGER

(75) Inventors: Michael L. Perry, Glastonbury, CT (US); Arun Pandy, Manchester, CT (US); Jinlei Ding, Shanghai (CN)

(73) Assignee: United Technologies Corporation, Farmington, CT (US)

(*) Notice: Subject to any disclaimer, the term of this patent is extended or adjusted under 35 U.S.C. 154(b) by 1622 days.

(21) Appl. No.: 13/238,921

(22) Filed: Sep. 21, 2011

(65) Prior Publication Data

US 2013/0071714 A1  Mar. 21, 2013

(51) Int. Cl.
| | |
|---|---|
| H01M 4/36 | (2006.01) |
| H01M 8/00 | (2016.01) |
| H01M 8/04014 | (2016.01) |
| H01M 8/18 | (2006.01) |
| H01M 8/24 | (2016.01) |
| H01M 8/2465 | (2016.01) |
| H01M 8/04029 | (2016.01) |
| H01M 8/04007 | (2016.01) |

(52) U.S. Cl.
CPC ... *H01M 8/04014* (2013.01); *H01M 8/04029* (2013.01); *H01M 8/04067* (2013.01); *H01M 8/188* (2013.01); *H01M 8/245* (2013.01); *H01M 8/246* (2013.01); *H01M 8/2465* (2013.01); *Y02E 60/528* (2013.01)

(58) Field of Classification Search
CPC .. H01M 8/04014; H01M 8/188; H01M 8/245; H01M 8/2465; H01M 8/04029; H01M 8/04067
USPC ................. 429/457, 101, 498, 513
See application file for complete search history.

(56) References Cited

U.S. PATENT DOCUMENTS

| | | | |
|---|---|---|---|
| 5,486,430 A | * | 1/1996 | Gorbell et al. ............... 429/434 |
| 6,001,226 A | | 12/1999 | Freire et al. |
| 6,475,661 B1 | | 11/2002 | Pellegri et al. |
| 6,524,452 B1 | | 2/2003 | Clark et al. |

(Continued)

FOREIGN PATENT DOCUMENTS

| | | |
|---|---|---|
| JP | 07176326 | 7/1995 |
| JP | 2004335158 A | 11/2004 |

(Continued)

OTHER PUBLICATIONS

Oedegaard et al: "Characterisation of direct methanol fuel cells under near ambient conditions" Journal of Power Sources, vol. 157, No. 1, Jun. 19, 2006 pp. 244-252.

(Continued)

*Primary Examiner* — Helen O Conley
(74) *Attorney, Agent, or Firm* — O'Shea Getz P.C.

(57) ABSTRACT

A flow battery stack includes a plurality of flow battery cells, a manifold and a heat exchanger. Each flow battery cell includes an electrode layer that is wet by an electrolyte solution having a reversible redox couple reactant. The manifold includes a solution passage that exchanges the electrolyte solution with the flow battery cells. The heat exchanger includes a heat exchange fluid passage. The heat exchanger exchanges heat between the electrolyte solution in the solution passage and a heat exchange fluid directed through the heat exchange fluid passage. The flow battery cells, the manifold and the heat exchanger are arranged between first and second ends of the flow battery stack.

19 Claims, 5 Drawing Sheets

(56) References Cited

U.S. PATENT DOCUMENTS

| | | |
|---|---|---|
| 6,555,267 B1 | 4/2003 | Broman et al. |
| 6,692,862 B1 | 2/2004 | Zocchi |
| 6,869,717 B2 | 3/2005 | Cargnelli et al. |
| 7,078,118 B2 | 7/2006 | Schrooten et al. |
| 7,265,456 B2 | 9/2007 | Hennessy |
| 7,309,540 B2 | 12/2007 | Wang |
| 7,682,728 B2 | 3/2010 | Harper |
| 7,687,193 B2 | 3/2010 | Harper |
| 2004/0170893 A1 | 9/2004 | Nakaishi et al. |
| 2005/0158614 A1 | 7/2005 | Hennessy |
| 2008/0274393 A1 | 11/2008 | Markoski |
| 2009/0047570 A1 | 2/2009 | Harper |
| 2009/0047571 A1 | 2/2009 | Harper |
| 2010/0003545 A1 | 1/2010 | Horne et al. |
| 2010/0323264 A1 | 12/2010 | Chiang et al. |
| 2011/0223450 A1 | 9/2011 | Horne |
| 2011/0223451 A1 | 9/2011 | Winter et al. |

FOREIGN PATENT DOCUMENTS

| | | |
|---|---|---|
| JP | 2007188730 A | 7/2007 |
| JP | 2010277811 A | 12/2010 |
| WO | 2011/075135 | 6/2011 |

OTHER PUBLICATIONS

Merida W R et al: "Non-planar architecture for proton exchange membrane fuel cells" Journal of Power Sources, vol. 102, No. 1-2 Dec. 1, 2001, pp. 178-185.
PCT Search Report for PCT/US2012/056647 Nov. 13, 2012.
PCT Search Report for PCT/US2012/056647 Dec. 18, 2012.
Office action for U.S. Appl. No. 13/194,486 dated Jun. 4, 2014.
JP office action for JP2014-523109 dated Dec. 6, 2016.
Office action for JP2014-53202 dated Feb. 7, 2017.

\* cited by examiner

FIG. 7

FLOW BATTERY STACK WITH AN INTEGRATED HEAT EXCHANGER

CROSS-REFERENCE TO RELATED APPLICATIONS

This application is related to U.S. patent application Ser. No. 13/194,486, which is incorporated by reference in its entirety.

BACKGROUND

1. Technical Field

This disclosure relates generally to a flow battery system and, more particularly, to a flow battery stack with an integrated heat exchanger.

2. Background Information

A typical flow battery system includes a flow battery stack, an anolyte reservoir, and a catholyte reservoir. An anolyte solution is circulated between the anolyte reservoir and the flow battery stack. A catholyte solution is circulated between the catholyte reservoir and the flow battery stack.

The flow battery system may also include a heat exchanger for regulating temperatures of the anolyte and/or catholyte solutions. A radiator, for example, may be connected inline between the flow battery stack and the anolyte and/or catholyte reservoir to exchange heat energy between ambient air and the anolyte and/or catholyte solution. The anolyte and/or catholyte solution, however, may corrode typical radiator materials, which are metals such as steel, brass, and aluminum. Such a radiator, therefore, is typically constructed from corrosion resistant materials, which may increase the cost and inefficiency of the radiator. Alternatively, a plurality of heating fluid tubes may be arranged in the flow battery stack adjacent a plurality flow battery cells. Heat energy is exchanged between a heating fluid directed through the tubes and the anolyte and/or catholyte solutions provided to each cell. Such heating fluid tubes, however, may increase the complexity, size and cost of the flow battery stack.

DETAILED DESCRIPTION

Figure 1:
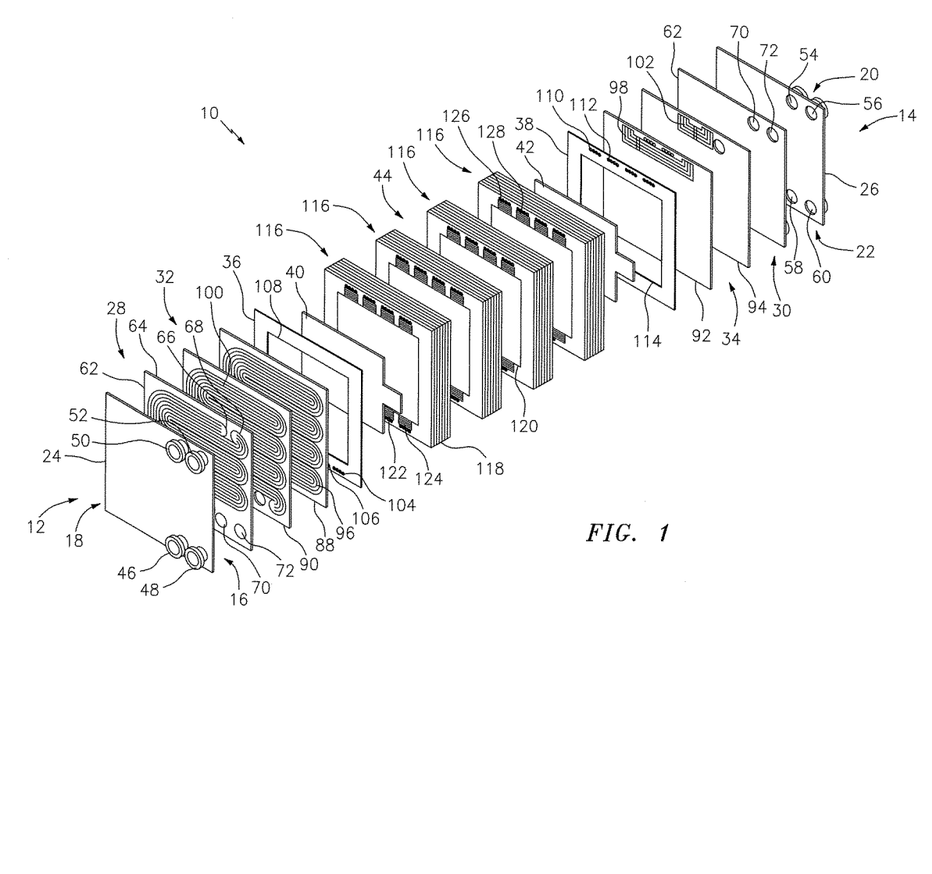
FIG. 1 illustrates an exploded view of a flow battery stack.

FIG. 1 illustrates a flow battery stack 10. The flow battery stack 10 extends longitudinally between a first end 12 and a second end 14. The flow battery stack 10 extends laterally between a first side 16 and a second side 18. The flow battery stack 10 extends vertically between a third side 20 (e.g., a top side) and a fourth side 22 (e.g., a bottom side). The flow battery stack 10 includes a first cover plate 24, a second cover plate 26, a first heat exchanger 28, a second heat exchanger 30, a first manifold 32, a second manifold 34, a first frame plate 36, a second frame plate 38, a first current collector 40, a second current collector 42, and a flow battery cell stack 44.

The first cover plate 24 includes a first solution inlet 46, a second solution inlet 48, a heat exchange fluid inlet 50, and a heat exchange fluid outlet 52. The first and second solution inlets 46 and 48 are disposed adjacent a corner adjacent the first side 16 and the fourth side 22, and extend longitudinally through the first cover plate 24. The fluid inlet and outlet 50 and 52 are disposed adjacent a corner adjacent the first side 16 and the third side 20, and extend longitudinally through the first cover plate 24.

The second cover plate 26 includes a first solution outlet 54, a second solution outlet 56, a heat exchange fluid inlet 58, and a heat exchange fluid outlet 60. The first and second solution outlets 54 and 56 are disposed adjacent a corner adjacent the first side 16 and the third side 20, and extend longitudinally through the second cover plate 26. The fluid inlet and outlet 58 and 60 are disposed adjacent a corner adjacent the first side 16 and the fourth side 22, and extend longitudinally through the second cover plate 26.

Figure 2:
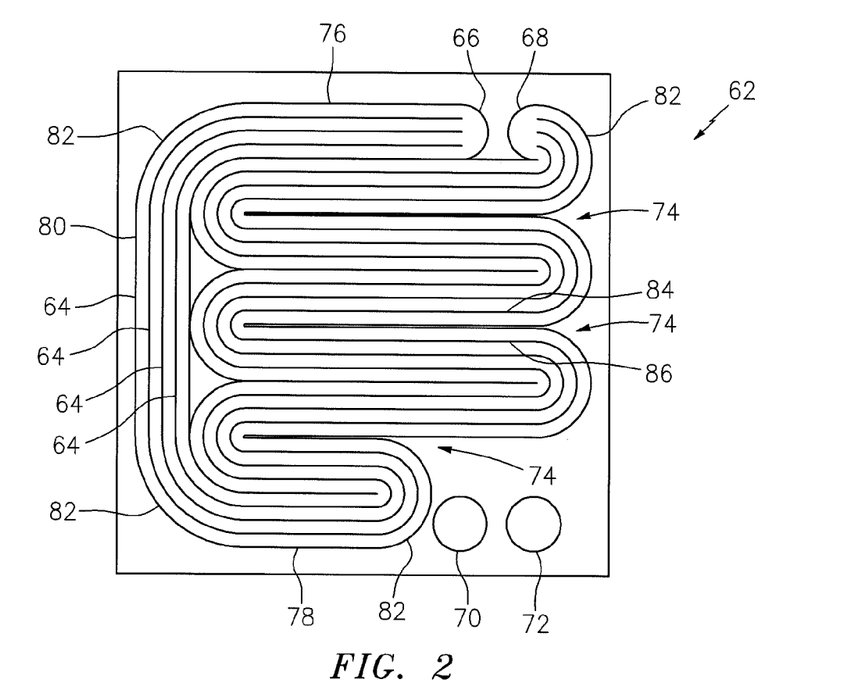
FIG. 2 illustrates a first plate surface of a heat exchanger plate.

The first and second heat exchangers 28 and 30 each include a heat exchanger plate 62. FIG. 2 illustrates a first plate surface of the heat exchanger plate 62. The heat exchanger plate 62 includes one or more heat exchange fluid passages 64, a heat exchange fluid first well 66, a heat exchange fluid second well 68, a first solution flow aperture 70, and a second solution flow aperture 72. The fluid passages 64 are disposed on the first plate surface, and extend from the first well 66 to the second well 68. The first and second solution flow apertures 70 and 72 extend longitudinally through the heat exchanger plate 62.

The fluid passages 64 may be arranged in a parallel and tortuous (e.g., serpentine) configuration to increase heat exchange surface areas thereof. Each of the fluid passages 64 may include, for example, a plurality of passage segments that are connected (e.g., end-to-end) to provide each fluid passage with a relative long length for increasing (e.g., maximizing) its heat exchange surface area.

The passage segments may be configured having straight, arced, bent, curved, spiraled and/or twisted geometries. In the embodiment illustrated in FIG. 2, for example, the passage segments include a plurality of counter-flow passage segments 74, a plurality of substantially straight passage segments 76, 78 and 80, and a plurality of curved passage segments 82. Each counter-flow passage segment 74 includes a first passage segment 84 and a second passage segment 86. The first passage segment 84 is connected to the second passage segment 86 such that a solution flows through the first passage segment 84 in a first direction, and through the second passage segment 86 in a second direction that is substantially opposite the first direction. The straight passage segments include a plurality of laterally extending passage segments 76 and 78, and a vertically extending passage segment 80.

Referring again to FIG. 1, the first manifold 32 includes an inlet first manifold plate 88 and an inlet second manifold plate 90. The second manifold 34 includes an outlet first manifold plate 92 and an outlet second manifold plate 94. Each first manifold plate 88, 92 includes one or more first solution passages 96, 98, respectively. Each second manifold plate 90, 94 includes one or more second solution passages 100, 102, respectively. The solution passages in each respective manifold plate may be arranged in a parallel and tortuous (e.g., serpentine) configuration that, for example, reduces shunt current losses within the flow battery stack 10. One or more of the solution passages may also be configured with a plurality of flow regions. An example of such solution passage configurations is disclosed in U.S. patent application Ser. No. 13/194,486, which is hereby incorporated by reference in its entirety.

The first frame plate 36 includes one or more first solution flow apertures 104, one or more second solution flow apertures 106, and a central aperture 108. The first and second solution flow apertures 104 and 106 may be disposed adjacent the fourth side 22, and extend longitudinally through the first frame plate 36. The central aperture 108 extends longitudinally through the first frame plate 36.

The second frame plate 38 includes one or more first solution flow apertures 110, one or more second solution flow apertures 112, and a central aperture 114. The first and second solution flow apertures 110, 112 may be disposed adjacent the third side 20, and extend longitudinally through the second frame plate 38. The central aperture 114 extends longitudinally through the second frame plate 38.

The flow battery cell stack 44 may include one or more flow battery cell sub-stacks 116. Each flow battery cell sub-stack 116 may include a sub-stack frame 118 and a plurality of flow battery cells 120.

The sub-stack frame 118 includes one or more first inlet apertures 122, one or more second inlet apertures 124, one or more first outlet apertures 126 and one or more second outlet apertures 128.

Figure 3:
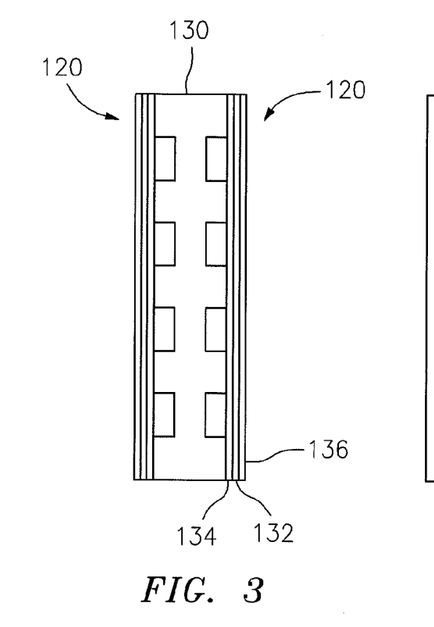
FIG. 3 illustrates a plurality of flow battery cells separated by a bipolar plate.

FIG. 3 illustrates a plurality of flow battery cells 120 separated by a bipolar plate 130. Each flow battery cell 120 includes a separator 132 disposed between a first electrode layer 134 and a second electrode layer 136. The separator 132 may be an ion-exchange membrane. The first and the second electrode layers 134 and 136 may be liquid-porous electrode layers. Examples of a bipolar plate, separator and electrode layers are disclosed in PCT/US09/68681, and U.S. patent application Ser. Nos. 13/084,156 and 13/023,101, which are assigned to the assignee of disclosed flow battery stack, each of which is incorporated by reference in its entirety.

Referring to FIGS. 1 and 3, the first electrode layers 134 are arranged in fluid communication with a flow path extending between the first inlet apertures 122 and the first outlet apertures 126. The second electrode layers 136 are arranged in fluid communication with a flow path extending between the second inlet apertures 124 and the second outlet apertures 128.

Referring to FIG. 1, in an assembled flow battery stack configuration, the flow battery cell sub-stacks 116 are mated together to form the flow battery cell stack 44. The first current collector 40 is positioned in the central aperture 108, and is electrically connected to the flow battery cell stack 44. The second current collector 42 is positioned in the central aperture 114, and is electrically connected to the flow battery cell stack 44.

The first frame plate 36 is mated with the flow battery cell stack 44 such that the first solution flow apertures 104 are connected to the first inlet apertures 122, and the second solution flow apertures 106 are connected to the second inlet apertures 124. The second frame plate 38 is mated with the flow battery cell stack 44 such that the first solution flow apertures 110 are connected to the first outlet apertures 126, and the second solution flow apertures 112 are connected to the second outlet apertures 128.

The inlet first manifold plate 88 is mated with the inlet second manifold plate 90, thereby forming the first manifold 32. The first manifold 32 is mated with the first frame plate 36 such that the first solution passages 96 are connected to the first solution flow apertures 104, and the second solution passages 100 are connected to the second solution flow apertures 106.

The outlet first manifold plate 92 is mated with the outlet second manifold plate 94, thereby forming the second manifold 34. The second manifold 34 is mated with the second frame plate 38 such that the first solution passages 98 are connected to the first solution flow apertures 110, and the second solution passages 102 are connected to the second solution flow apertures 112.

The first heat exchanger 28 is mated with the first manifold 32 such that the first solution flow aperture 70 is connected to the first solution passages 96, and the second solution flow aperture 72 is connected to the second solution passages 100. The second heat exchanger 30 is mated with the second manifold 34 such that the first solution flow aperture 70 is connected to the first solution passages 98, and the second solution flow aperture 72 is connected to the second solution passages 102.

The first cover plate 24 is mated with the first heat exchanger 28 such that the first solution inlet 46 is connected to the first solution flow aperture 70, the second solution inlet 48 is connected to the second solution flow aperture 72, the fluid inlet 50 is connected to the first well 66, and the fluid outlet 52 is connected to the second well 68. The second cover plate 26 is mated with the second heat exchanger 30 such that the first solution outlet 54 is connected to the first solution flow aperture 70, the second solution outlet 56 is connected to the second solution flow aperture 72, the fluid inlet 58 is connected to the first well 66 (see FIG. 2), and the fluid outlet 60 is connected to the second well 68 (see FIG. 2).

During operation, a first heat exchange fluid (e.g., an antifreeze solution), and a second heat exchange fluid (e.g., an antifreeze solution), a first electrolyte solution (e.g., a vanadium anolyte) having a first reversible reduction-oxidation ("redox") couple reactant (e.g., $V^{2+}$ and/or $V^{3+}$ ions), and a second electrolyte solution (e.g., a vanadium catholyte) having a second reversible redox couple reactant (e.g., $V^{4+}$ and/or $V^{5+}$ ions) are circulated through the flow battery stack 10. The first and second heat exchange fluids may be the same fluid where, for example, a common coolant loop (not shown) is connected to both the first and second heat exchangers 28 and 30.

The first heat exchange fluid flows through the fluid passages 64 from the fluid inlet 50 to the fluid outlet 52. The second heat exchange fluid flows through the fluid passages 64 from the fluid inlet 58 to the fluid outlet 60.

The first electrolyte solution flows into the inlet first passages 96 through the first solution inlet 46 and the first solution flow apertures 70. The inlet first passages 96 direct the first electrolyte solution into the flow battery cells 120 through the first frame plate 36. The first electrolyte solution wets (e.g., permeates into and/or contacts an outer surface of) the first electrode layers 134 (see FIG. 3), and subsequently flows into the outlet first passages 98 through the second frame plate 38. The outlet first passages 98 direct the first electrolyte solution out of the flow battery stack 10 through the first solution flow aperture 70 and the first solution outlet 54.

The second electrolyte solution flows into the second solution passages 100 through the second solution inlet 48 and the second solution flow apertures 72. The second solution passages 100 direct the second electrolyte solution into the flow battery cells 120 through the first frame plate 36. The second electrolyte solution wets (e.g., permeates into and/or contacts an outer surface of) the second electrode layers 136 (see FIG. 3), and subsequently flows into the second solution passages 102 through the second frame plate 38. The second solution passages 102 direct the second electrolyte solution out of the flow battery stack 10 through the second solution flow aperture 72 and the second solution outlet 56.

Temperatures of the first and/or second electrolyte solutions may be decreased, increased, and/or maintained by exchanging heat energy between the electrolyte solutions and the first and/or second heat exchange fluids. The temperatures of the first and second electrolyte solutions may be decreased upstream of the flow battery cells 120, for example, where heat energy flows into the first heat exchange fluid from the electrolyte solutions through the heat exchanger 28. The temperatures of the first and second electrolyte solutions may also be decreased downstream of the flow battery cells 120, for example, where heat energy flows into the first heat exchange fluid from the electrolyte solutions through the heat exchanger 30.

In some embodiments, the flow battery stack may include a single heat exchanger. The flow battery stack may include the first heat exchanger 28, for example, to regulate the temperatures of the electrolyte solutions within the flow battery cells 120. Alternatively, the heat exchanger may include the second heat exchanger 30, for example, to regulate the temperatures of the electrolyte solutions exiting the flow battery stack 10.

In some embodiments, the first and second passages may be disposed on opposite sides of a manifold plate.

In some embodiments, the heat exchanger plates 62, the manifold plates 88, 90, 92 and 94, the sub-stack frames 118, and/or the frame plates 36 and 38 are constructed from a non-electrically conducting material (i.e., an insulator) such as, for example, plastic or a plastic-composite material (e.g., fiber reinforced plastic). The material may be selected to be relatively easy to mold into the complex shapes of the aforesaid components. The material may also be selected to have a glass-transition temperature that is higher than a predetermined threshold such as a maximum operating temperature of the flow battery stack system 10; e.g., a glass transition temperature greater than approximately sixty degrees Celsius for a vanadium-redox battery. Examples of suitable materials include thermoplastics, thermosets or semi-crystalline plastics (e.g., HDPE, PEEK).

In some embodiments, at least a portion of the bipolar plate 130 (e.g., a portion of the plate contacting active areas of the adjacent flow battery cells) is constructed from a corrosion resistant, electrically-conductive material. Examples of suitable materials include carbon (e.g., graphite, etc.), or metals with corrosion resistant coatings.

In some embodiments, the first and second current collectors 40 and 42 may be constructed from a material having a relatively high electrical conductivity, and a relatively low contact resistance with an adjacent component (e.g., a bipolar plate) within the cell stack 44. The first and second current collectors 40 and 42 may be configured as, for example, gold-plated copper plates.

Figure 4:
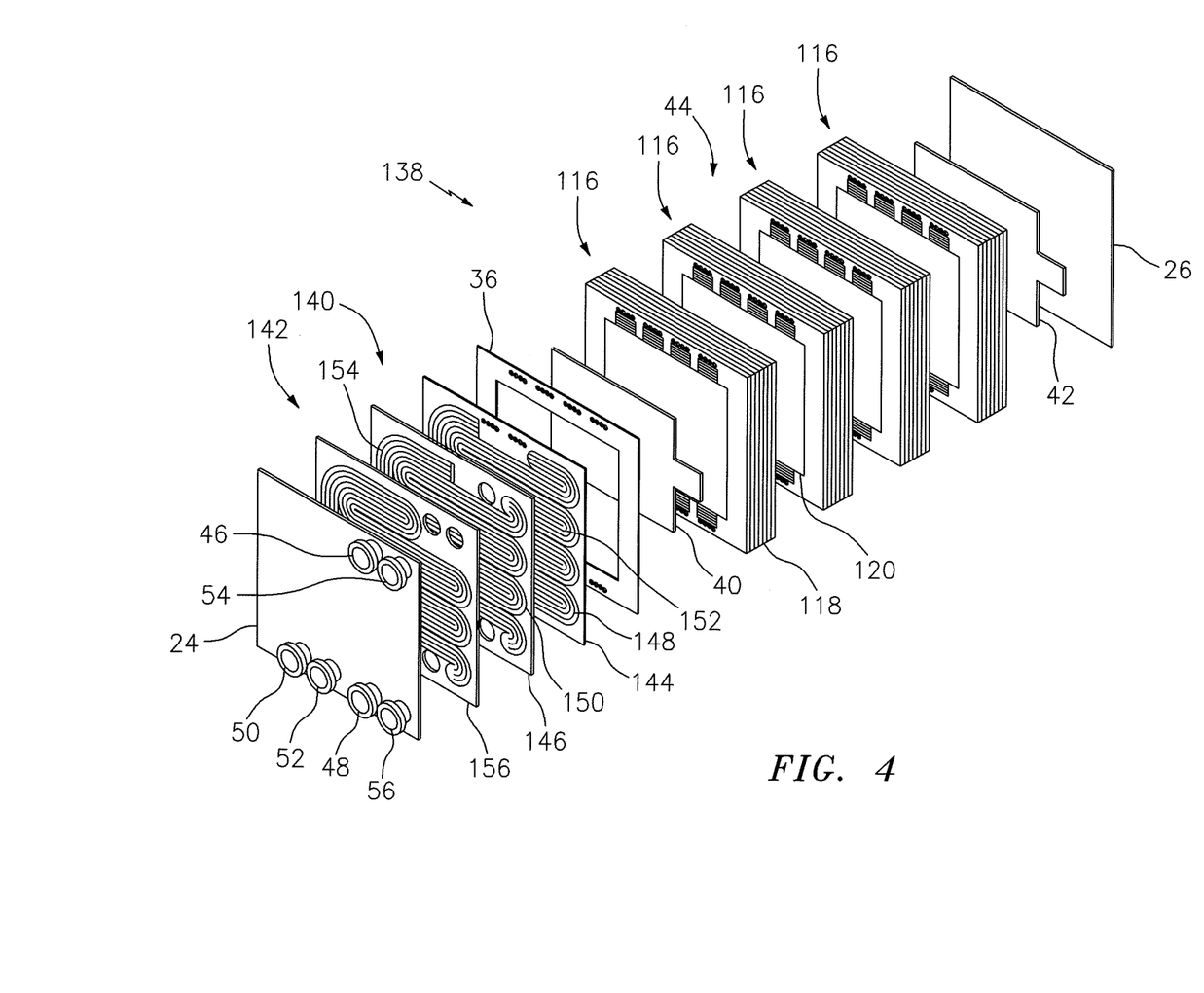
FIG. 4 illustrates an exploded view of an alternative embodiment flow battery stack.

FIG. 4 illustrates an alternative flow battery stack 138. In contrast to the flow battery stack 10 illustrated in FIG. 1, the flow battery stack 138 includes a dual flow manifold 140, a heat exchanger 142, and a cover plate 143. The manifold 140 is configured to circulate the first and second electrolyte solutions through the flow battery cells 120; i.e., provide the electrolyte solutions to the flow battery cells 120, and receive the electrolyte solutions from the flow battery cells 120. The manifold 140 includes a first manifold plate 144 and a second manifold plate 146. Each manifold plate 144, 146 respectively includes one or more first solution passages 148, 150 and one or more second solution passages 152, 154.

Figure 5:
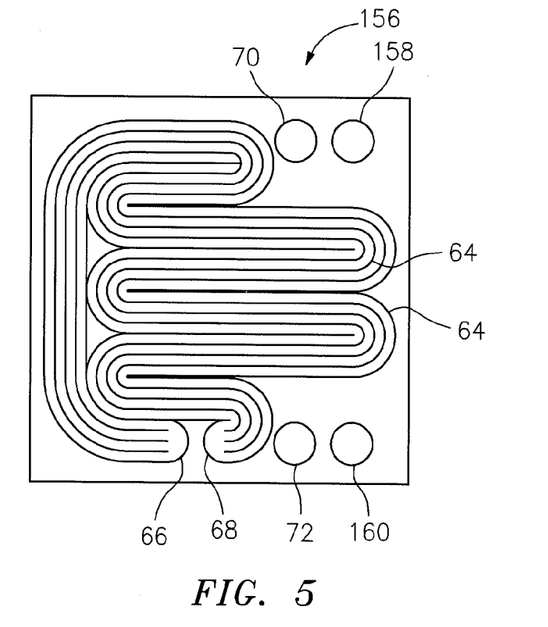
FIG. 5 illustrates a first plate surface of an alternative embodiment heat exchanger plate.

The heat exchanger 142 includes a heat exchanger plate 156. Referring to FIG. 5, the heat exchanger plate 156 is substantially the same as the heat exchanger plate 62, except for the principle difference that the heat exchanger plate 156 further includes additional first and second solution flow apertures 158 and 160 to accommodate the return electrolyte solution flow through the manifold 140.

Figure 6:
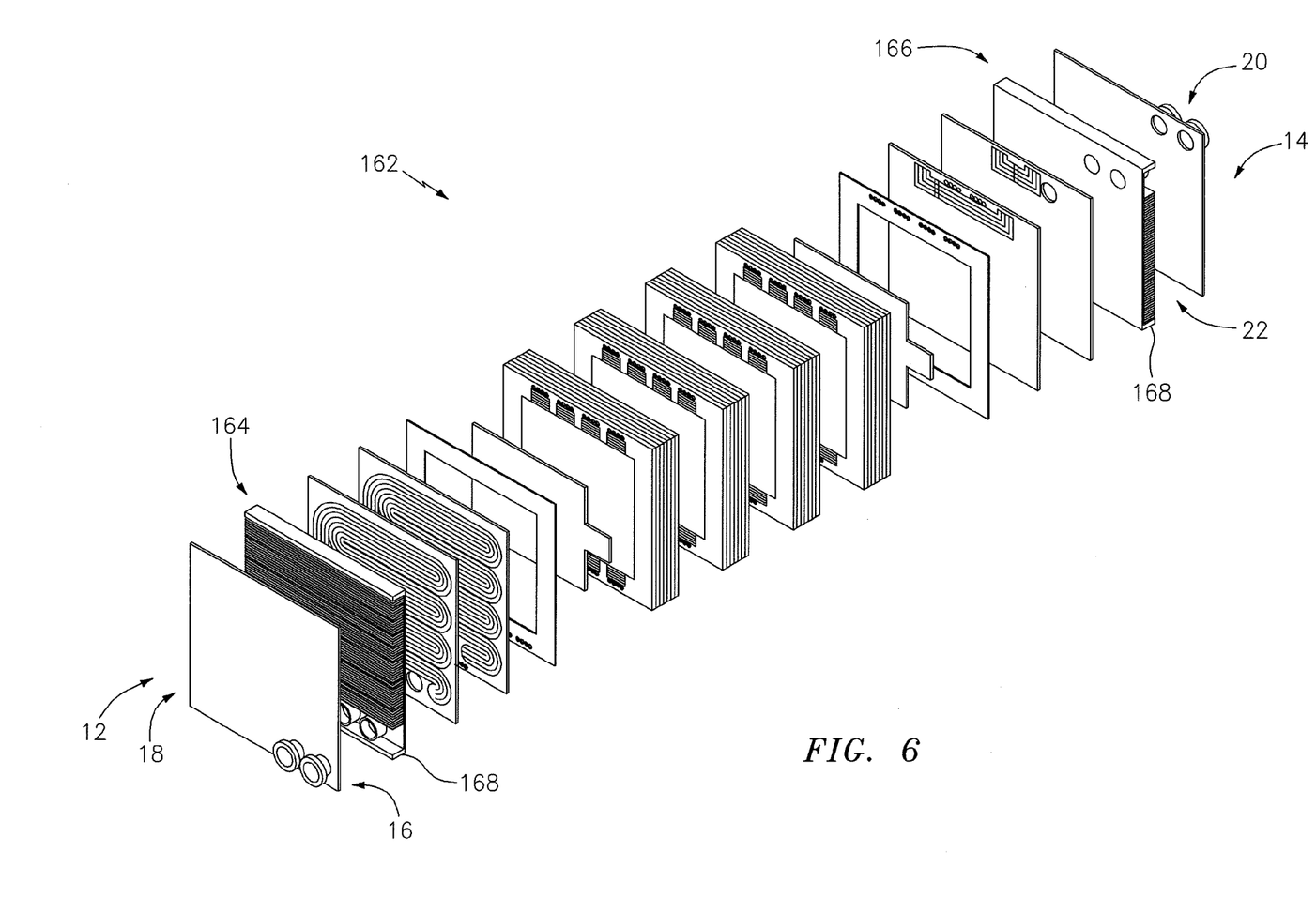
FIG. 6 illustrates an exploded view of an alternative embodiment flow battery stack.

FIG. 6 illustrates an alternative flow battery stack 162. In contrast to the flow battery stack 10 illustrated in FIG. 1, the flow battery stack 162 includes first and second heat exchangers 164 and 166. Each heat exchanger 164, 166 is configured as a liquid-to-air heat exchanger, and includes a heat exchanger plate 168.

Figure 7:
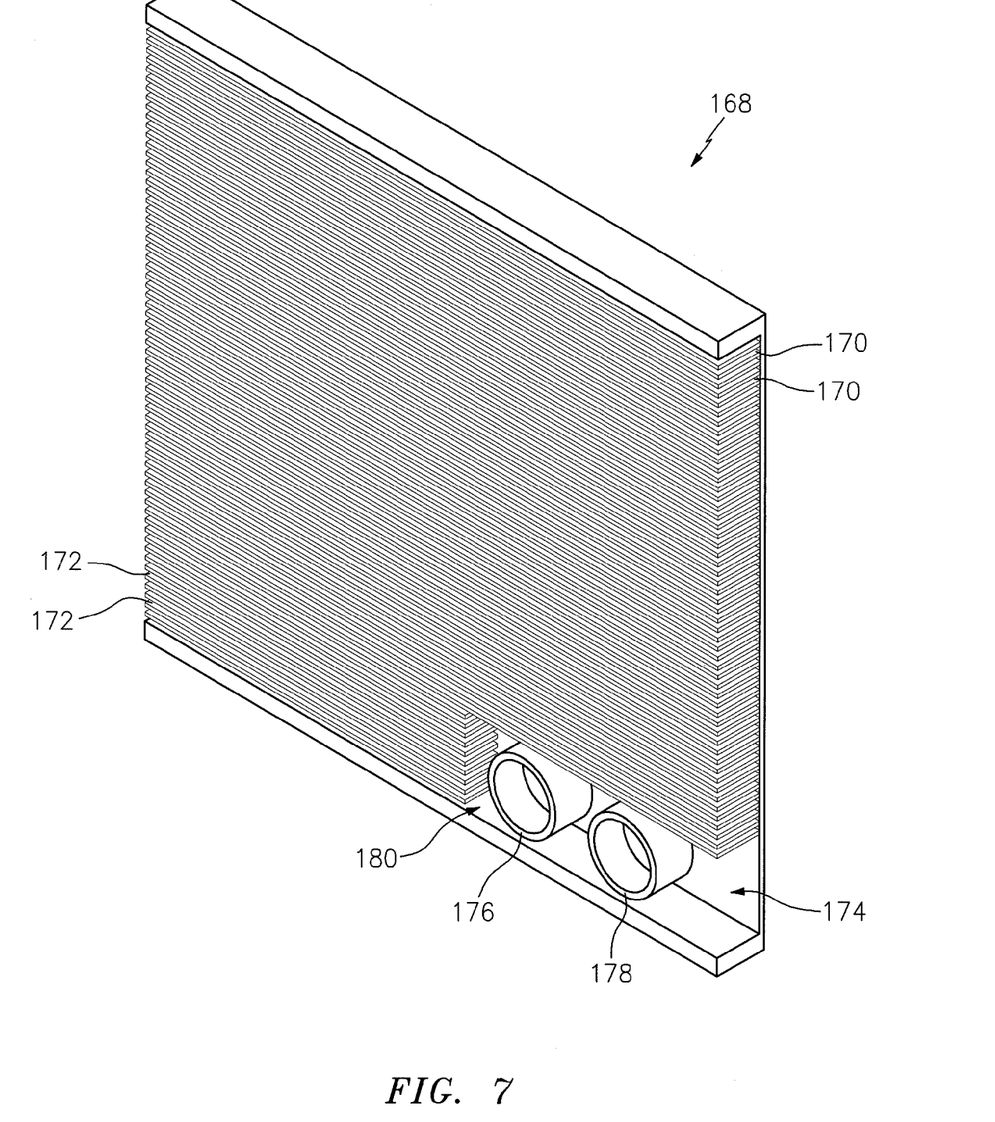
FIG. 7 illustrates a first plate surface of an alternative embodiment heat exchanger plate.

FIG. 7 illustrates a first side of the heat exchanger plate 168. The heat exchanger plate 168 includes one or more heat exchange fluid passages 170 and 172, a heat exchange fluid well 174, a first solution flow conduit 176, and a second solution flow conduit 178. The fluid passages 170 are arranged in parallel on the first side of the heat exchanger plate 168, and extend between the first side 16 and the second side 18 (see FIG. 6). The fluid passages 172 are arranged in parallel on the first side of the heat exchanger plate 168, and are connected to the fluid well 174. The fluid passages 172 and the fluid well 174 together form a combined heat exchange fluid passage 180 that extends between the first side 16 and the second side 18 (see FIG. 6). The first and the second solution flow conduits 176 and 178 extend axially through the fluid well 174.

During operation, the first and second electrolyte solutions are respectively directed through the heat exchanger plate 168 via the first and second flow conduits 176 and 178, respectively. The fluid passages 170 and the fluid passage 180 (i.e., the fluid passages 172 and the fluid well 174) direct a heat exchange fluid (e.g., ambient air) through the heat exchanger plate 168 in order to exchange heat energy with the first and/or second electrolyte solutions as described above.

While various embodiments of the present flow battery stack have been disclosed, it will be apparent to those of ordinary skill in the art that many more embodiments and implementations are possible. Accordingly, the present flow battery stack is not to be restricted except in light of the attached claims and their equivalents.

What is claimed is:

1. A flow battery stack, comprising:
   a stack of flow battery cells, each flow battery cell comprising an electrode layer that is wet by an electrolyte solution having a reversible redox couple reactant;
   a manifold comprising a solution passage that circulates the electrolyte solution through the flow battery cells, and a manifold plate, and wherein the solution passage is disposed with the manifold plate; and
   a heat exchanger comprising a heat exchange fluid passage, wherein the heat exchanger exchanges heat between the electrolyte solution in the solution passage and a heat exchange fluid directed through the heat exchange fluid passage; and
   wherein the flow battery cells, the manifold and the heat exchanger are connected between a first cover plate and a second cover plate; and
   wherein the heat exchanger and the manifold are arranged between the first cover plate and the flow battery cell stack.

2. The flow battery stack of claim 1, wherein the heat exchanger further comprises a heat exchanger plate, and wherein the heat exchange fluid passage is disposed with the heat exchanger plate.

3. The flow battery stack of claim 1, wherein the solution passage provides the electrolyte solution to the flow battery cells, and wherein the manifold further comprises a second solution passage that receives the electrolyte solution from the flow battery cells.

4. The flow battery stack of claim 1, further comprising a second manifold plate with a second solution passage that circulates the electrolyte solution through the flow battery cells, wherein the second manifold plate is arranged between the second cover plate and the flow battery cell stack.

5. The flow battery stack of claim 4, further comprising a second heat exchanger plate with a second heat exchange fluid passage, wherein the second heat exchanger plate is arranged with the second manifold plate between the second cover plate and the flow battery cell stack.

6. The flow battery stack of claim 2, wherein the heat exchanger comprises a liquid-to-air heat exchanger, and wherein the heat exchange fluid passage extends through the heat exchanger plate between opposite sides thereof.

7. The flow battery stack of claim 1, wherein the heat exchange fluid passage comprises a straight passage segment and a curved passage segment.

8. The flow battery stack of claim 1, wherein the heat exchange fluid passage comprises a first passage segment connected to a second passage segment, wherein the first passage segment directs the heat exchange fluid in a first direction, and wherein the second passage segment directs the heat exchange fluid in a second direction that is substantially opposite the first direction.

9. The flow battery stack of claim 1, wherein the heat exchanger comprises a non-electrically conducting material that comprises plastic.

10. A flow battery stack, comprising:
a stack of flow battery cells, each flow battery cell comprising an electrode layer that is wet by an electrolyte solution having a reversible redox couple reactant;
a manifold comprising a first solution passage, a second solution passage, and at least one manifold plate, wherein the first solution passage provides the electrolyte solution to the flow battery cells, and wherein the second solution passage receives the electrolyte solution from the flow battery cells, and wherein the first and second solution passages are disposed with the at least one manifold plate; and
a heat exchanger comprising a heat exchanger plate with a heat exchange fluid passage, wherein the heat exchanger exchanges heat between the electrolyte solution in the first and the second solution passages and a heat exchange fluid directed through the heat exchange fluid passage;
wherein the manifold and the heat exchanger are connected between the flow battery cell stack and a cover plate.

11. The flow battery stack of claim 10, wherein the heat exchanger is arranged between the cover plate and the manifold.

12. The flow battery stack of claim 10, wherein the at least one manifold plate comprises a first manifold plate and a second manifold plate, wherein the first solution passage is disposed with the first manifold plate, and wherein the second solution passage is disposed with the second manifold plate.

13. The flow battery stack of claim 10, wherein the heat exchange fluid passage comprises a tortuous heat exchange fluid passage.

14. The flow battery stack of claim 10, wherein the heat exchanger comprises a liquid-to-air heat exchanger, and wherein the heat exchange fluid passage extends through the heat exchanger plate between opposite sides thereof.

15. A flow battery stack, comprising:
a stack of flow battery cells, each flow battery cell comprising an electrode layer that is wet by an electrolyte solution having a reversible redox couple reactant;
a first manifold plate comprising a first solution passage that provides the electrolyte solution to the flow battery cells;
a second manifold plate comprising a second solution passage that receives the electrolyte solution from the flow battery cells; and
a heat exchanger comprising a heat exchanger plate with a heat exchange fluid passage, wherein the heat exchanger exchanges heat between a heat exchange fluid directed through the heat exchange fluid passage and the electrolyte solution in one of the first solution passage and the second solution passage;
wherein the flow battery cells, the first manifold plate, the second manifold plate and the heat exchanger are connected between a first cover plate and a second cover plate;
wherein one of
the heat exchanger and the first manifold plate are arranged between the flow battery cell stack and the first cover plate; and
the heat exchanger and the second manifold plate are arranged between the flow battery cell stack and the second cover plate.

16. The flow battery stack of claim 15, wherein the heat exchanger is arranged one of
between the first cover plate and the first manifold plate; and
between the second cover plate and the second manifold plate.

17. The flow battery stack of claim 15, further comprising a second heat exchanger plate with a second heat exchange fluid passage, wherein the heat exchanger plate and the first manifold plate are arranged between the first cover plate and the flow battery cell stack, and wherein the second heat exchanger plate and the second manifold plate are arranged between the second cover plate and the flow battery cell stack.

18. The flow battery stack of claim 15, wherein the heat exchange fluid passage comprises a tortuous heat exchange fluid passage.

19. The flow battery stack of claim 15, wherein the heat exchanger comprises a liquid-to-air heat exchanger, and wherein the heat exchange fluid passage extends through the heat exchanger plate between opposite sides thereof.

* * * * *